C. T. LYON & W. F. SKAGGS.
COMBINED WAGON BRAKE AND LOCK.
APPLICATION FILED DEC. 19, 1907.

905,896.

Patented Dec. 8, 1908.
2 SHEETS—SHEET 1.

C. T. LYON & W. F. SKAGGS.
COMBINED WAGON BRAKE AND LOCK.
APPLICATION FILED DEC. 19, 1907.
905,896.
Patented Dec. 8, 1908.
2 SHEETS—SHEET 2.
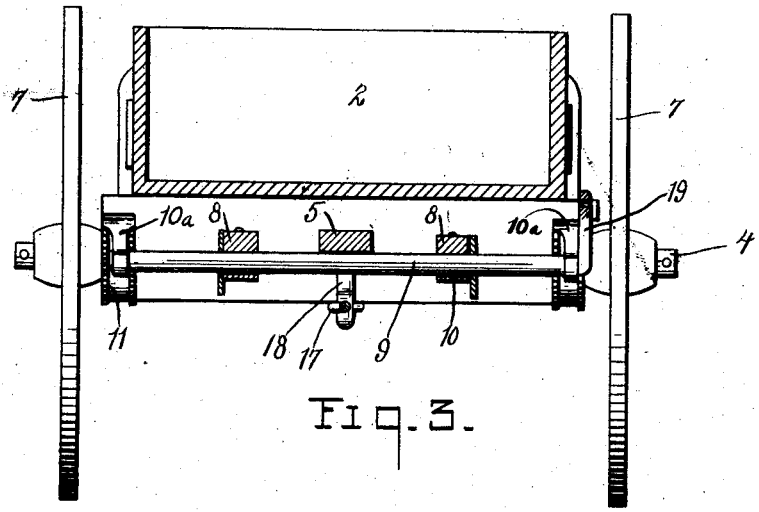
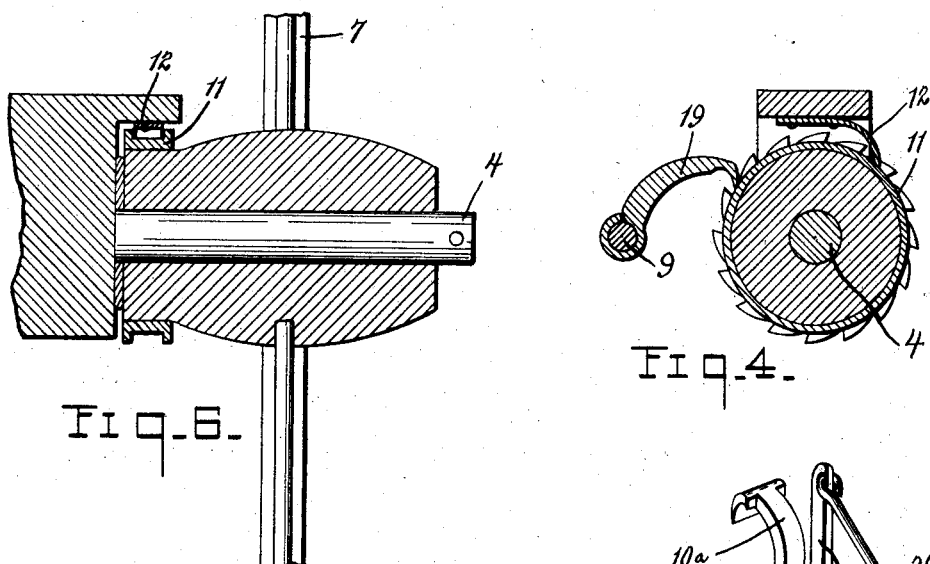

UNITED STATES PATENT OFFICE.

CLABURN T. LYON AND WILLIAM F. SKAGGS, OF REDBUSH, KENTUCKY, ASSIGNORS OF ONE-THIRD TO ISAAC R. BOWLING, OF REDBUSH, KENTUCKY.

COMBINED WAGON BRAKE AND LOCK.

No. 905,896.     Specification of Letters Patent.     Patented Dec. 8, 1908.

Application filed December 19, 1907. Serial No. 407,230.

To all whom it may concern:

Be it known that we, CLABURN T. LYON and WILLIAM F. SKAGGS, citizens of the United States, residing at Redbush, in the county of Johnson and State of Kentucky, have invented certain new and useful Improvements in a Combined Wagon Brake and Lock, of which the following is a specification, reference being had to the accompanying drawings.

This invention relates to improvements in vehicles and more particularly to a combined wagon brake and lock.

The object of the invention is to provide a simple and practical device of this character which may be conveniently operated to frictionally brake the forward movement of the wagon in descending a hill and also lock the rear wheels against backward movement to prevent the wagon from moving backwardly should the team stop pulling while ascending a hill.

A further object of the invention is to provide a locking device of this character which will be automatic and which may be readily thrown out of operation.

Figure 1:
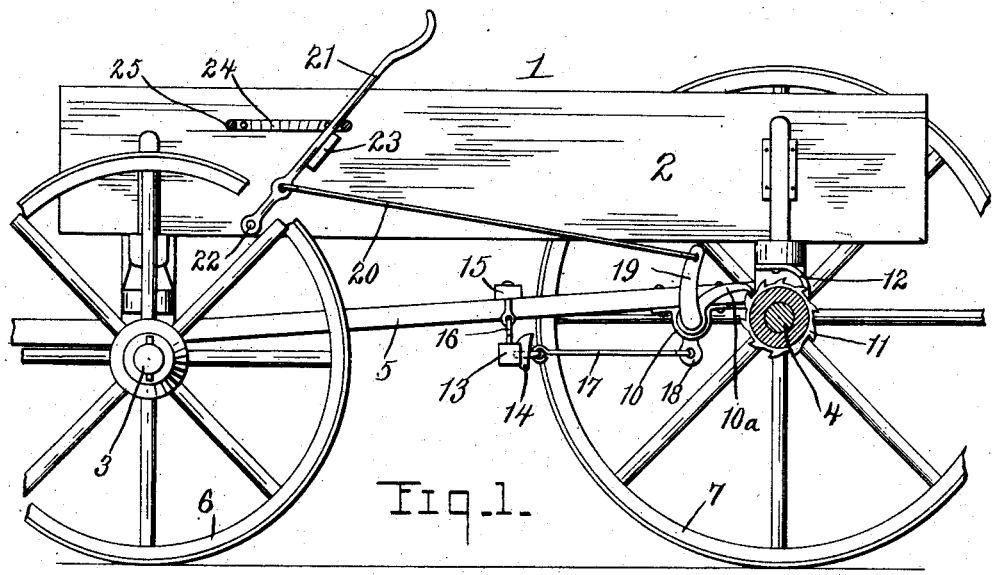
Figure 2:
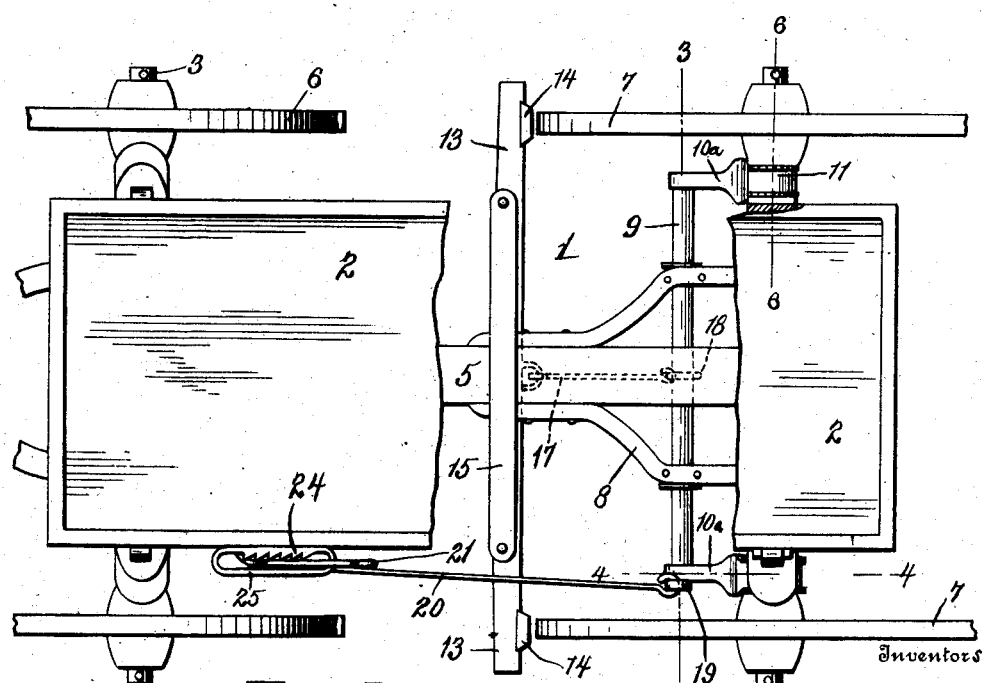

With the above and other objects in view, the invention consists of the novel features of construction and the combination and arrangement of parts hereinafter described and claimed, and illustrated in the accompanying drawings, in which Figure 1 is a side elevation of a wagon showing the application of the invention thereto; Fig. 2 is a top plan view of the same with portions of the body of the wagon broken away; Fig. 3 is a vertical transverse section; Fig. 4 is a detail section taken on the plane indicated by the line 4—4 in Fig. 2; Fig. 5 is a detail perspective of the rock shaft carrying the locking pawls or dogs; and Fig. 6 is a detail sectional view of the ratchet sleeve.

In the drawings 1 denotes a wagon or other vehicle having a body 2 mounted on a running gear consisting of front and rear axles 3, 4 united by a reach 5 and carrying front and rear wheels 6, 7. At the rear of the reach 5 are the usual hounds 8.

9 denotes a transverse rock shaft journaled in bearings 10 upon the hounds 8. At the ends of this shaft are fixed locking dogs or pawls $10^a$ adapted to engage ratchet wheels 11 fixed upon the hubs of the rear wheels 7. The ratchet wheels 11 are preferably in the form of cylindrical bands or sleeves adapted to fit over the inner end of the wheels' hubs and having their edges bent outwardly at right angles and notched to provide annular rows of ratchet teeth. The outer ends of the pawls $10^a$ are comparatively broad so that they engage both rows of the ratchet teeth. In order to keep the ratchet wheels free from mud and sand we preferably attach to the sand board or bolster of the rear axle scraper blades 12 which are resilient and have their free ends bearing upon the bands or sleeves of the wheels 11 between the two rows of ratchet teeth as more clearly shown in Fig. 4. The disposition of the pawls $10^a$ is such that they are adapted to drop by gravity into engagement with the ratchets so as to prevent the backward or retrograde rotation of the rear wheels 7.

13 denotes a transverse brake beam carrying at its ends friction brake shoes 14 to engage the peripheries of the wheels 7. This brake beam is hung for swinging movement from a cross bar 15 secured transversely upon the reach and the hangers preferably consist of eye bolts 16 arranged in the bar 15 and beam 13 as clearly shown in the drawings.

In order to permit the brake and the locking devices to be simultaneously operated by a single operating means, a link or rod 17 is arranged between the center of the brake beam 13 and a depending arm 18 upon the center of the rock shaft 9, and at one end of the latter is provided an upwardly extending arm 19 which is connected by a link or rod 20 to an operating lever 21. The lever 21 is pivoted at its lower end at 22 upon one side of the wagon and upon its upper portion is provided with a pawl 23 adapted to engage the teeth of a ratchet bar 24 arranged upon the wagon body and surrounded by a guide loop 25 in which latter the lever 21 is adapted to swing.

From the foregoing and upon reference to the drawings it will be seen that when the lever 21 is thrown in a forward direction the arm or crank 19 will be swung forwardly to rock the shaft 9 and swing the arm or crank 18 rearwardly. This movement of the latter causes the link 17 to swing the brake beam 13 rearwardly so that its shoes 14 are brought into frictional contact with the wheels 7. Said rocking movement of the shaft also elevates the locking pawls or dogs 10ª. When the lever 21 is thrown in the opposite direction or rearwardly the parts are moved in the reversed direction so that the brake shoes 14 are held out of contact with the wheels and the locking pawls 10ª are allowed to drop by gravity into engagement with the ratchet wheels 11, thereby locking said wheels against rearward or retrograde rotation so that the wagon cannot possibly move rearwardly when standing on an incline or when the team ceases pulling for an instant while climbing a hill. When said lever 21 is thrown rearwardly the operation of the locking pawls will be automatic and as the wagon is pulled forwardly the ratchets will slip under the pawls and the instant the team ceases to pull the rear wheels will be locked against backward movement. By shifting the lever 21 to an intermediate position and engaging its pawl 23 with one of the intermediate teeth of the ratchet or rack 24 it will be seen that the locking pawls 10ª will be held elevated and out of engagement with the ratchet wheels 11 and at the same time the brake shoes 14 will be held away from the wheels. Owing to the peculiar construction and arrangement of the parts of the device it will be seen that the one lever can be used for simultaneously operating and controlling both the braking and the locking devices.

While we have shown and described the preferred embodiment of our invention it will be understood that we do not wish to be limited to the precise showing set forth and that various changes in the form, proportion and minor details may be resorted to without departing from the spirit or sacrificing any of the advantages of the invention.

Having thus described our invention what we claim is:

1. The combination with a vehicle having front and rear axles, a reach connecting the same, hounds between the reach and the rear axle, wheels upon said axles and a body supported from said axles, of annular series of ratchet teeth upon the hubs of the rear wheels, transversely alined bearings upon the hounds, a transverse rock shaft journaled in said bearings, pawls having their inner ends fixed to said rock shaft and their outer ends curved to engage said ratchet teeth, a transverse beam upon the reach, a brake beam having shoes to engage the rear wheels, links pivotally suspending the brake beam from said transverse beam, a crank upon the rock shaft, a link connecting said crank to the brake beam, a lever pivoted to the vehicle body, a second crank arm upon the rock shaft, a link connecting said second crank arm to said lever, and a pawl and ratchet locking device for said lever.

2. The combination with a vehicle, of an annular sleeve or band secured upon the hub of one of the vehicle wheels and having at its edges annular rows of ratchet teeth, a locking pawl to co-act with said teeth, and a scraper adapted to engage said band or sleeve between its rows of ratchet teeth.

In testimony whereof we hereunto affix our signatures in the presence of two witnesses.

CLABURN T. LYON.
WILLIAM F. SKAGGS.

Witnesses:
P. T. HOLBROOK,
O. H. BROWN.